(12) United States Patent
Kussel

(10) Patent No.: US 9,491,450 B2
(45) Date of Patent: Nov. 8, 2016

(54) VEHICLE CAMERA ALIGNMENT SYSTEM

(75) Inventor: Marcel Kussel, Aschaffenburg (DE)

(73) Assignee: MAGNA ELECTRONIC INC., Auburn Hills, MI (US)

(*) Notice: Subject to any disclaimer, the term of this patent is extended or adjusted under 35 U.S.C. 154(b) by 269 days.

(21) Appl. No.: 14/233,509

(22) PCT Filed: Jul. 30, 2012

(86) PCT No.: PCT/US2012/048800
§ 371 (c)(1),
(2), (4) Date: Jan. 17, 2014

(87) PCT Pub. No.: WO2013/019707
PCT Pub. Date: Feb. 7, 2013

(65) Prior Publication Data
US 2014/0184799 A1    Jul. 3, 2014

Related U.S. Application Data

(60) Provisional application No. 61/513,745, filed on Aug. 1, 2011.

(51) Int. Cl.
*H04N 17/00* (2006.01)
*G01B 11/27* (2006.01)

(52) U.S. Cl.
CPC ........... *H04N 17/002* (2013.01); *G01B 11/272* (2013.01)

(58) Field of Classification Search
None
See application file for complete search history.

(56) References Cited

U.S. PATENT DOCUMENTS

| | | |
|---|---|---|
| 4,961,625 A | 10/1990 | Wood et al. |
| 4,966,441 A | 10/1990 | Conner |
| 4,967,319 A | 10/1990 | Seko |
| 4,970,653 A | 11/1990 | Kenue |
| 5,003,288 A | 3/1991 | Wilhelm |
| 5,059,877 A | 10/1991 | Teder |
| 5,064,274 A | 11/1991 | Alten |
| 5,072,154 A | 12/1991 | Chen |
| 5,096,287 A | 3/1992 | Kakinami et al. |
| 5,148,014 A | 9/1992 | Lynam et al. |

(Continued)

FOREIGN PATENT DOCUMENTS

| | | |
|---|---|---|
| EP | 0353200 | 1/1990 |
| EP | 0361914 | 2/1993 |

(Continued)

OTHER PUBLICATIONS

Behringer et al., "Simultaneous Estimation of Pitch Angle and Lane Width from the Video Image of a Marked Road," pp. 966-973, Sep. 12-16, 1994.

(Continued)

*Primary Examiner* — Christopher S Kelley
*Assistant Examiner* — Kaitlin A Retallick
(74) *Attorney, Agent, or Firm* — Gardner, Linn, Burkhart & Flory, LLP

(57) ABSTRACT

A vision system for a vehicle includes at least one imaging sensor disposed at the vehicle and having an exterior field of view. The imaging sensor is operable to capture image data. The imaging sensor includes or is associated with an inclination sensor. At least one other inclination sensor is disposed at the vehicle. A processing system is operable to process outputs of the inclination sensors to determine an alignment or misalignment of the at least one imaging sensor at the vehicle.

12 Claims, 15 Drawing Sheets

(56) References Cited

U.S. PATENT DOCUMENTS

| | | |
|---|---|---|
| 5,166,681 A | 11/1992 | Bottesch et al. |
| 5,177,606 A | 1/1993 | Koshizawa |
| 5,182,502 A | 1/1993 | Slotkowski et al. |
| 5,193,029 A | 3/1993 | Schofield |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,276,389 A | 1/1994 | Levers |
| 5,289,321 A | 2/1994 | Secor |
| 5,305,012 A | 4/1994 | Faris |
| 5,307,136 A | 4/1994 | Saneyoshi |
| 5,351,044 A | 9/1994 | Mathur et al. |
| 5,355,118 A | 10/1994 | Fukuhara |
| 5,386,285 A | 1/1995 | Asayama |
| 5,406,395 A | 4/1995 | Wilson et al. |
| 5,408,346 A | 4/1995 | Trissel et al. |
| 5,414,461 A | 5/1995 | Kishi et al. |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,469,298 A | 11/1995 | Suman et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,648,835 A | 7/1997 | Uzawa |
| 5,661,303 A | 8/1997 | Teder |
| 5,670,935 A | 9/1997 | Schofield et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,796,094 A | 8/1998 | Schofield et al. |
| 5,837,994 A | 11/1998 | Stam et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,896,085 A | 4/1999 | Mori et al. |
| 5,920,367 A | 7/1999 | Kajimoto et al. |
| 5,923,027 A | 7/1999 | Stam et al. |
| 5,929,786 A | 7/1999 | Schofield et al. |
| 5,956,181 A | 9/1999 | Lin |
| 6,049,171 A | 4/2000 | Stam et al. |
| 6,052,124 A | 4/2000 | Stein et al. |
| 6,066,933 A | 5/2000 | Ponziana |
| 6,084,519 A | 7/2000 | Coulling et al. |
| 6,091,833 A | 7/2000 | Yasui et al. |
| 6,097,024 A | 8/2000 | Stam et al. |
| 6,100,811 A | 8/2000 | Hsu et al. |
| 6,175,300 B1 | 1/2001 | Kendrick |
| 6,198,409 B1 | 3/2001 | Schofield et al. |
| 6,201,642 B1 | 3/2001 | Bos |
| 6,226,061 B1 | 5/2001 | Tagusa |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,285,778 B1 | 9/2001 | Nakajima et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,353,392 B1 | 3/2002 | Schofield et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,445,287 B1 | 9/2002 | Schofield et al. |
| 6,477,464 B2 | 11/2002 | McCarthy et al. |
| 6,498,620 B2 | 12/2002 | Schofield et al. |
| 6,515,378 B2 | 2/2003 | Drummond et al. |
| 6,516,664 B2 | 2/2003 | Lynam |
| 6,553,130 B1 | 4/2003 | Lemelson et al. |
| 6,570,998 B1 | 5/2003 | Ohtsuka et al. |
| 6,574,033 B1 | 6/2003 | Chui et al. |
| 6,578,017 B1 | 6/2003 | Ebersole et al. |
| 6,587,573 B1 | 7/2003 | Stam et al. |
| 6,589,625 B1 | 7/2003 | Kothari et al. |
| 6,593,011 B2 | 7/2003 | Liu et al. |
| 6,593,698 B2 | 7/2003 | Stam et al. |
| 6,594,583 B2 | 7/2003 | Ogura et al. |
| 6,611,610 B1 | 8/2003 | Stam et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,056 B2 | 1/2004 | Downs |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,741,377 B2 | 5/2004 | Miles |
| 6,744,353 B2 | 6/2004 | Sjönell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,807,287 B1 | 10/2004 | Hermans |
| 6,822,563 B2 | 11/2004 | Bos et al. |
| 6,823,241 B2 | 11/2004 | Shirato et al. |
| 6,864,930 B2 | 3/2005 | Matsushita et al. |
| 6,882,287 B2 | 4/2005 | Schofield |
| 6,889,161 B2 | 5/2005 | Winner et al. |
| 6,909,753 B2 | 6/2005 | Meehan et al. |
| 6,946,978 B2 | 9/2005 | Schofield |
| 6,968,736 B2 | 11/2005 | Lynam |
| 6,975,775 B2 | 12/2005 | Rykowski et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |

(56) References Cited

U.S. PATENT DOCUMENTS

| | | |
|---|---|---|
| 7,202,776 B2 | 4/2007 | Breed |
| 7,227,459 B2 | 6/2007 | Bos et al. |
| 7,227,611 B2 | 6/2007 | Hull et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,375,803 B1 | 5/2008 | Bamji |
| 7,380,948 B2 | 6/2008 | Schofield et al. |
| 7,388,182 B2 | 6/2008 | Schofield et al. |
| 7,400,950 B2 * | 7/2008 | Reich .................. A63H 27/04 701/3 |
| 7,423,821 B2 | 9/2008 | Bechtel et al. |
| 7,425,076 B2 | 9/2008 | Schofield et al. |
| 7,526,103 B2 | 4/2009 | Schofield et al. |
| 7,541,743 B2 | 6/2009 | Salmeen et al. |
| 7,565,006 B2 | 7/2009 | Stam et al. |
| 7,566,851 B2 | 7/2009 | Stein et al. |
| 7,605,856 B2 | 10/2009 | Imoto |
| 7,619,508 B2 | 11/2009 | Lynam et al. |
| 7,720,580 B2 | 5/2010 | Higgins-Luthman |
| 7,786,898 B2 | 8/2010 | Stein et al. |
| 7,792,329 B2 | 9/2010 | Schofield et al. |
| 7,843,451 B2 | 11/2010 | Lafon |
| 7,855,778 B2 | 12/2010 | Yung et al. |
| 7,881,496 B2 | 2/2011 | Camilleri |
| 7,914,187 B2 | 3/2011 | Higgins-Luthman et al. |
| 7,930,160 B1 | 4/2011 | Hosagrahara et al. |
| 7,949,486 B2 | 5/2011 | Denny et al. |
| 8,017,898 B2 | 9/2011 | Lu et al. |
| 8,064,643 B2 | 11/2011 | Stein et al. |
| 8,082,101 B2 | 12/2011 | Stein et al. |
| 8,164,628 B2 | 4/2012 | Stein et al. |
| 8,224,031 B2 | 7/2012 | Saito |
| 8,233,045 B2 | 7/2012 | Luo et al. |
| 8,254,635 B2 | 8/2012 | Stein et al. |
| 8,300,886 B2 | 10/2012 | Hoffmann |
| 8,378,851 B2 | 2/2013 | Stein et al. |
| 8,421,865 B2 | 4/2013 | Euler et al. |
| 8,452,055 B2 | 5/2013 | Stein et al. |
| 8,553,088 B2 | 10/2013 | Stein et al. |
| 2002/0005778 A1 | 1/2002 | Breed |
| 2002/0011611 A1 | 1/2002 | Huang et al. |
| 2002/0113873 A1 | 8/2002 | Williams |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0119020 A1 * | 6/2004 | Bodkin .................. G01J 3/02 250/353 |
| 2004/0164228 A1 | 8/2004 | Fogg et al. |
| 2005/0219852 A1 | 10/2005 | Stam et al. |
| 2005/0237385 A1 | 10/2005 | Kosaka et al. |
| 2006/0050018 A1 | 3/2006 | Hutzel et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2007/0024724 A1 | 2/2007 | Stein et al. |
| 2007/0104476 A1 | 5/2007 | Yasutomi et al. |
| 2007/0242339 A1 | 10/2007 | Bradley |
| 2008/0043099 A1 | 2/2008 | Stein et al. |
| 2008/0147321 A1 | 6/2008 | Howard et al. |
| 2008/0192132 A1 | 8/2008 | Bechtel et al. |
| 2008/0266396 A1 | 10/2008 | Stein |
| 2009/0113509 A1 | 4/2009 | Tseng et al. |
| 2009/0160987 A1 | 6/2009 | Bechtel et al. |
| 2009/0190015 A1 | 7/2009 | Bechtel et al. |
| 2009/0256938 A1 | 10/2009 | Bechtel et al. |
| 2009/0290032 A1 | 11/2009 | Zhang et al. |
| 2010/0220173 A1 * | 9/2010 | Anguelov .............. G06T 7/004 348/36 |
| 2010/0253784 A1 * | 10/2010 | Oleg .................. G06T 7/0018 348/187 |
| 2010/0266161 A1 * | 10/2010 | Kmiecik ................ G01C 21/26 382/103 |
| 2011/0216201 A1 | 9/2011 | McAndrew et al. |
| 2012/0045112 A1 | 2/2012 | Lundblad et al. |
| 2012/0069185 A1 | 3/2012 | Stein |
| 2012/0200707 A1 | 8/2012 | Stein et al. |
| 2012/0314071 A1 | 12/2012 | Rosenbaum et al. |
| 2012/0320209 A1 | 12/2012 | Vico |
| 2013/0141580 A1 | 6/2013 | Stein et al. |
| 2013/0147957 A1 | 6/2013 | Stein |
| 2013/0169812 A1 | 7/2013 | Lu et al. |
| 2013/0286193 A1 | 10/2013 | Pflug |

FOREIGN PATENT DOCUMENTS

| | | |
|---|---|---|
| EP | 0640903 | 3/1995 |
| EP | 0697641 | 2/1996 |
| EP | 1115250 | 7/2001 |
| EP | 2377094 | 10/2011 |
| EP | 2667325 | 11/2013 |
| GB | 2233530 | 9/1991 |
| JP | S5539843 | 3/1980 |
| JP | S58110334 | 6/1983 |
| JP | 6216073 | 4/1987 |
| JP | 6272245 | 5/1987 |
| JP | S62-131837 | 6/1987 |
| JP | 01123587 | 5/1989 |
| JP | H1168538 | 7/1989 |
| JP | H236417 | 8/1990 |
| JP | 03099952 | 4/1991 |
| JP | 3099952 | 4/1991 |
| JP | 6227318 | 8/1994 |
| JP | 07105496 | 4/1995 |
| JP | 2630604 | 7/1997 |
| JP | 200274339 | 3/2002 |
| JP | 20041658 | 1/2004 |
| WO | WO2012139636 | 10/2012 |
| WO | WO2012139660 | 10/2012 |
| WO | WO2012143036 | 10/2012 |

OTHER PUBLICATIONS

Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 2004.
Franke et al., "Autonomous driving approaches downtown", Intelligent Systems and Their Applications, IEEE 13 (6), 40-48, Nov./Dec. 1999.
International Search Report and Written Opinion date Oct. 16, 2012 from corresponding PCT Application No. PCT/US2012/048800.
Kastrinaki et al., "A survey of video processing techniques for traffic applications".
Sun et al., "On-road vehicle detection using optical sensors: a review", IEEE Conference on Intelligent Transportation Systems, 2004.
Van Leeuwen et al., "Motion Estimation with a Mobile Camera for Traffic Applications", IEEE, US, vol. 1, Oct. 3, 2000, pp. 58-63.
Van Leeuwen et al., "Motion Interpretation for In-Car Vision Systems", IEEE, US, vol. 1, Sep. 30, 2002, p. 135-140.
Van Leeuwen et al., "Real-Time Vehicle Tracking in Image Sequences", IEEE, US, vol. 3, May 21, 2001, pp. 2049-2054, XP010547308.
Van Leeuwen et al., "Requirements for Motion Estimation in Image Sequences for Traffic Applications", IEEE, US, vol. 1, May 24, 1999, pp. 145-150, XP010340272.
Vlacic et al. (Eds), "Intelligent Vehicle Tecnologies, Theory and Applications", Society of Automotive Engineers Inc., edited by SAE International, 2001.

\* cited by examiner

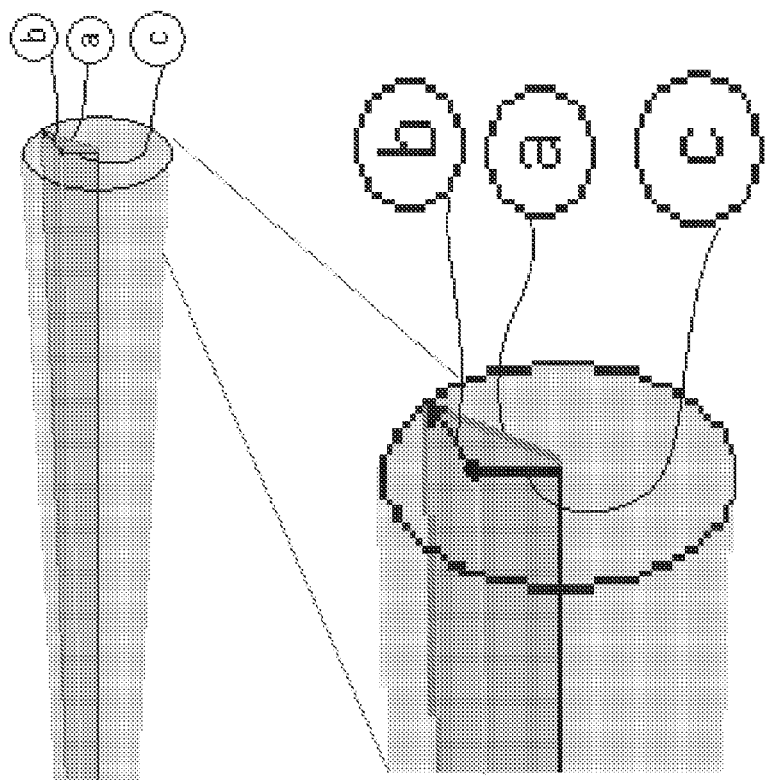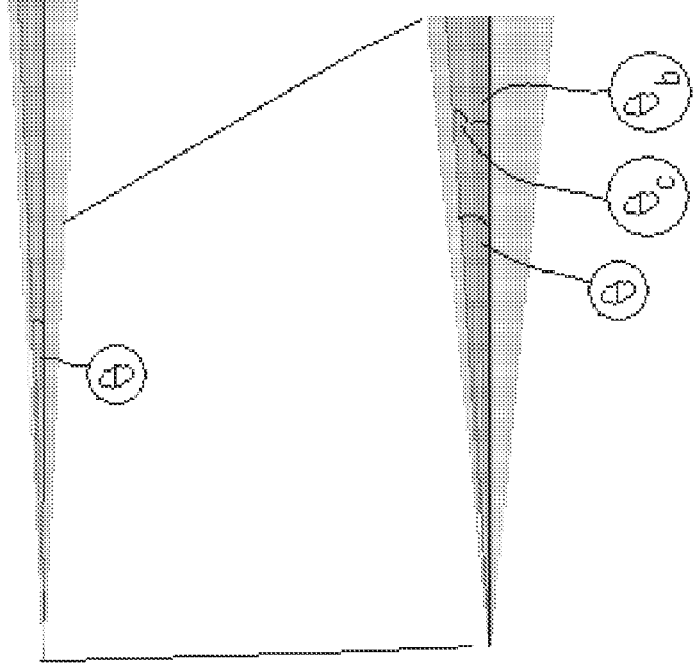
FIG. 8B

| deviation angle α | resulting deviation in a distance of 5m | resulting deviation in a distance of 7m |
|---|---|---|
| 0,014 | 1,22mm | 1,71mm |
| 0,024 | 2,09mm | 2,93mm |
| 0,115 | 10mm | 14mm |
| 0,229 | 20mm | 28mm |

FIG. 15A

| $\tan(\alpha) =$ | $\dfrac{\text{side opposite an angle} := \text{resulting deviation}}{\text{side adjacent to an angle} := \text{distance}}$ | (in one dimension) |
|---|---|---|

FIG. 15B

| $\alpha = \text{arc tan}$ | $\dfrac{\text{side opposite an angle} := \text{resulting deviation}}{\text{side adjacent to an angle} := \text{distance}}$ | (in one dimension) |
|---|---|---|

FIG. 15C

| $\theta = \text{arc tan}$ | $\dfrac{\text{side opposite an angle} := \text{resulting deviation}}{\text{side adjacent to an angle} := \text{distance}}$ | (in two dimensions) |
|---|---|---|

FIG. 15D

VEHICLE CAMERA ALIGNMENT SYSTEM

CROSS REFERENCE TO RELATED APPLICATIONS

The present application is a 371 national phase filing of PCT Application No. PCT/US2012/048880, filed Jul. 30, 2012, which claims the filing benefits of U.S. provisional application Ser. No. 61/513,745, filed Aug. 1, 2011, which is hereby incorporated herein by reference in its entirety.

FIELD OF THE INVENTION

The present invention relates to imaging systems or vision systems for vehicles and, more particularly, to a vision system that includes at least one imaging device or camera for capturing images exteriorly of the vehicle.

BACKGROUND OF THE INVENTION

Use of imaging sensors in vehicle imaging systems is common and known. Examples of such known systems are described in U.S. Pat. Nos. 5,949,331; 5,670,935; and/or 5,550,677, which are hereby incorporated herein by reference in their entireties. Vehicle vision camera service calibration algorithms are common and known. Examples of such known systems are described in PCT Publication No. WO 2011/085489, which is hereby incorporated herein by reference in its entirety.

SUMMARY OF THE INVENTION

The present invention provides a vision system or imaging system for a vehicle that utilizes one or more cameras to capture images exterior of the vehicle, and provides for alignment or alignment adjustment of the camera or cameras to correct deviations in the camera's alignment over the life of the vision system. Optionally, the alignment of other environmental sensors for machine vision may be determined and adjusted as well.

The camera or cameras or machine vision sensor or sensors of the vehicle may include an inclination sensor, such as a three axis inclination sensor, to detect the orientation of the camera relative to the earth. An output of the inclination sensor may be compared to an output of another inclination sensor of the vehicle or of one or more other cameras on the vehicle, and the system may determine when the camera may be misaligned, whereby the camera may be adjusted towards its initial or targeted orientation or alignment.

These and other objects, advantages, purposes and features of the present invention will become apparent upon review of the following specification in conjunction with the drawings.

BRIEF DESCRIPTION OF THE DRAWINGS

FIG. 8B is a schematic showing how the steradian angle $\theta$ adds up from a horizontal component $\theta_b$ and a vertical component $\theta_c$, with (b) and (c) being the resulting opposite legs of $\theta_b$ and $\theta_c$, and (a) being the geometrical sum of (b) plus (c) and the resulting opposite leg of $\theta$ ($\theta_c$ equates to a in FIG. 8A);

FIGS. 15A-D are tables showing the relation between a misalignment angle and a resulting deviation in distance.

DESCRIPTION OF THE PREFERRED EMBODIMENTS

Figure 1:
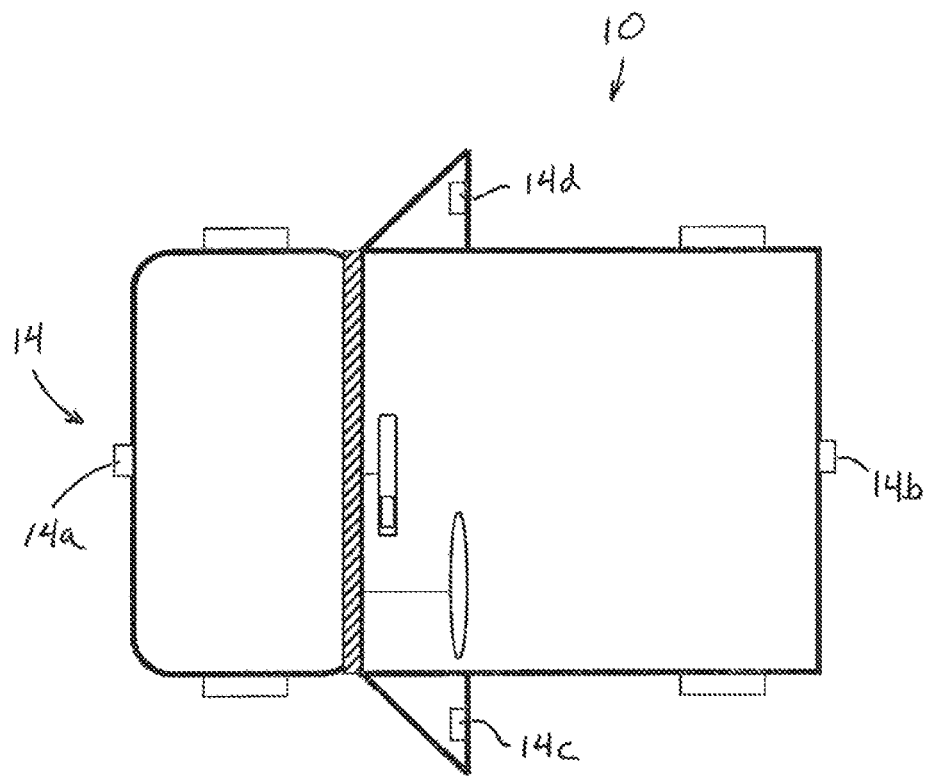
FIG. 1 is a plan view of a vehicle with a vision system and imaging sensors or cameras that provide exterior fields of view in accordance with the present invention.

Referring now to the drawings and the illustrative embodiments depicted therein, a vehicle 10 includes an imaging system or vision system 12 that includes at least one imaging sensor or camera 14 (such as four imaging sensors or cameras 14a, 14b, 14c, 14d at the front (or at the windshield), rear and sides of the vehicle, respectively), which capture images exterior of the vehicle (FIG. 1). The camera 14 includes an inclination sensor 16 (FIG. 2), such as a three axis inclination sensor or the like, which is operable to determine or detect or sense the orientation of the camera relative to the earth (such as the tilt or pitch or yaw or levelness of the camera). The vision system 12 is operable to compare an output of the inclination sensor 16 to an output of another inclination sensor of the vehicle or another inclination sensor or sensors of one or more of the other cameras mounted at the vehicle, as discussed below. Responsive to such comparison, the vision system 12 may determine when one or more of the cameras becomes misaligned, whereby the system may operate to adjust or reorient the camera towards its initial or targeted orientation or alignment or calibrated state, as also discussed below.

Camera based systems (such as multi-camera systems like a surround view system or the like, or a rear view camera or the like) typically require processing to correct deviations in the pitch, yaw and/or roll of the camera (extrinsic calibrations) over the life-time of the system and/or the vehicle, such as due to temperature variations or positional shifting of the camera due to vibrations and/or the like. Such processing may be required in order to provide proper image stitching or merging of images captured by multiple cameras (such as for a panoramic rearward view or such as for a surround view system or top-down or birds-eye view or the like), and/or to provide proper overlay positioning on the displayed images, such as for rear backup assist systems and the like.

Figure 4:
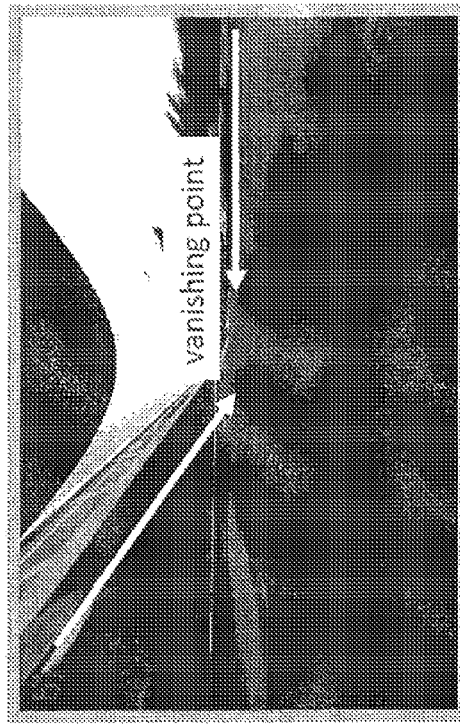
FIG. 4 is a perspective view of an image captured by a camera of a vehicle.
Figure 3:
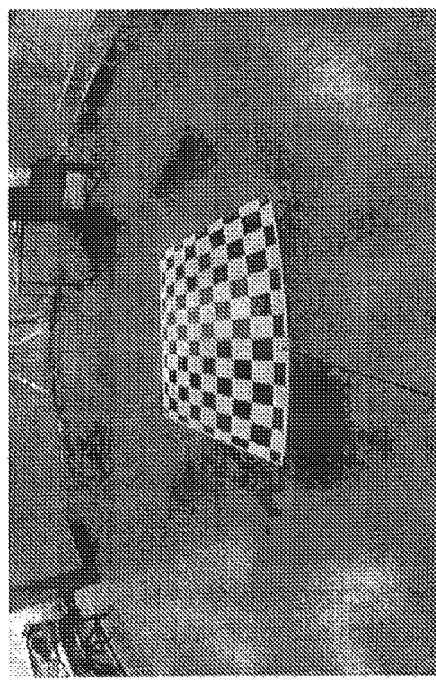
FIG. 3 is a perspective view of a target suitable for use in calibrating a camera for a vehicle.

Typically, automotive cameras are calibrated offline (without driving of the vehicle, such as in the vehicle assembly or production line), using targets, such as the target 18 shown in FIG. 3, where the positions and orientation of the target lines relative to the camera and vehicle are known. Optionally, some automotive cameras use image processing (such as of images or image data as shown in FIG. 4) to detect and correct for misalignment of the camera after the camera is installed at the vehicle and while the vehicle is driven on the road. For example, such alignment detection and correction via image processing is described in U.S. Pat. Nos. 7,991,522; 7,877,175 and 7,720,580, and/or R. Hartley and A. Zisserman, "Multiple View Geometry in Computer Vision", Cambridge, ISBN 978-0-521-54051-3, which are all hereby incorporated herein by reference in their entireties. Such image processing techniques work well for their intended purposes, but may require additional processing based online (during driving) calibration algorithms, and thus may require additional processing power (such as tracking, vanishing point estimation, trajectory calculations and the like).

The present invention provides an inclination sensor at the camera or cameras or environmental machine vision sensor or sensors, such as, for example, a radar sensor or a lidar sensor or the like, to determine a change in the position or orientation or alignment of the camera or machine vision sensor(s) over the life of the vehicle and/or vision system and/or camera or machine vision sensor(s). If the inclination sensor is installed in the camera (or is otherwise fixedly associated with the camera) and the relation between the camera and the inclination sensor is known, the orientation of the camera to the earth can be readily measured or determined without further image processing. For example, the inclination sensor may comprise a three axis inclination sensor, and the sensor's roll, pitch and yaw may be readily obtained by the vision system circuitry or control, without requiring further complex algorithms and image processing. Because the vehicle-to-earth relationship is not fixed (the vehicle travels on different roads or surfaces with different tilts, slopes, etc.), the system of the present invention includes a second inclination sensor or reference inclination sensor at the vehicle so that the system can calibrate the camera correctly to the vehicle at which it is mounted and not to a particular geographic location at the earth where the vehicle may be located.

Figure 2:
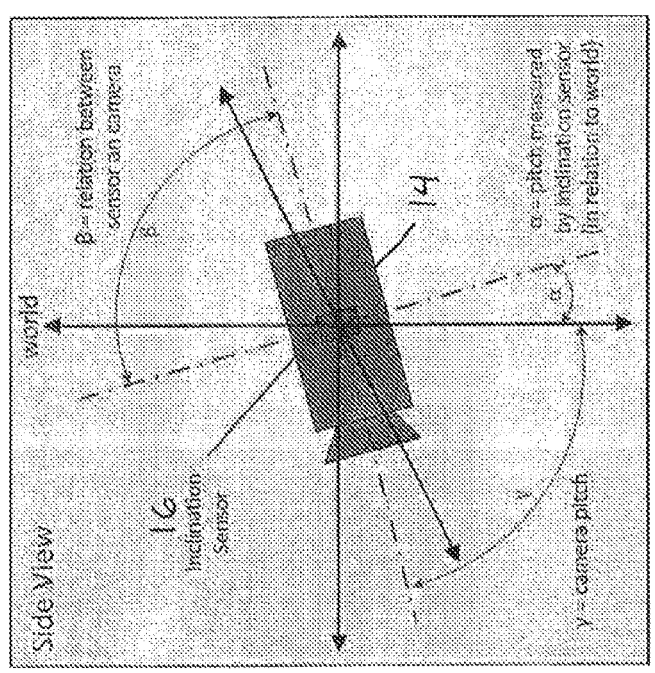
FIG. 2 is a schematic of a camera and inclination sensor in accordance with the present invention.

For example, and with reference to FIG. 2, an inclination sensor, such as a three-axis inclination sensor 16 of a camera 14, is operable to detect changes in the yaw, pitch and roll of the sensor and camera. The known relation between the camera and sensor allows for readily detecting changes for each angle (yaw, pitch and roll). With reference to FIG. 2, the angle $\beta$ is known due to the relation of the inclination sensor to the camera (and may be fixed), and thus a change of the pitch (for example) of the camera may be determined or measured responsive to the inclination sensor output (where the pitch is determined as $Y=\beta-\alpha$). Such inclination sensors provide high accuracy and resolution, and have long-run stability (such as, for example, a deviation of less than about 0.014 degrees after more than 500 hours in operation), and provide high reproducibility (such as better than about 0.01 degrees). Such inclination sensors are suitable for use in automotive applications and are currently used in other automotive applications.

Figure 5:
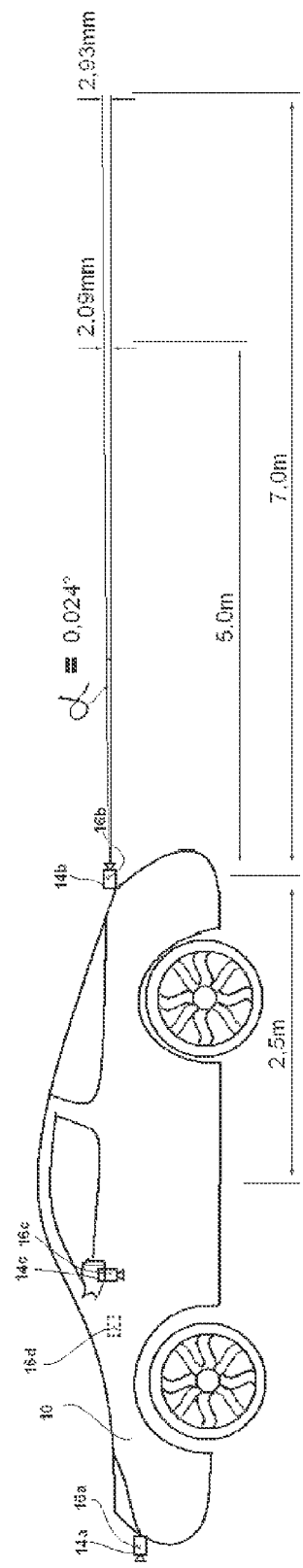
FIG. 5 is a side elevation and schematic of a vehicle with a vision system and cameras in accordance with the present invention.

The example in FIG. 5 demonstrates how little the effect of an exemplary deviation of about 0.014 degrees (plus 0.01 degrees tolerance equals about 0.024 degrees) is in a typical rear camera range of interest of about 5 and 7 meters turns out. In this example a describes a deviation angle between the camera's calibration direction and the camera's real viewing direction. The real viewing direction becomes measured by the inclination sensor 16b assembled to camera 14b (another sensor 16c is assembled or disposed at a side mirror camera 14c and another sensor 16a is disposed at camera 14a attached to vehicle 10). In the (rear) distance of seven meters, the deviation is just at 2.93 mm, which is much less than the typical resolution a three megapixel image sensor (1920×1600 pixel) has in it's center region (highest resolution area) for a rear view camera with fish eye optics having about an opening angle of about 185 degrees. Often the pixel resolution is already in the 'cm' area or thereabouts at that distance.

Figure 6:
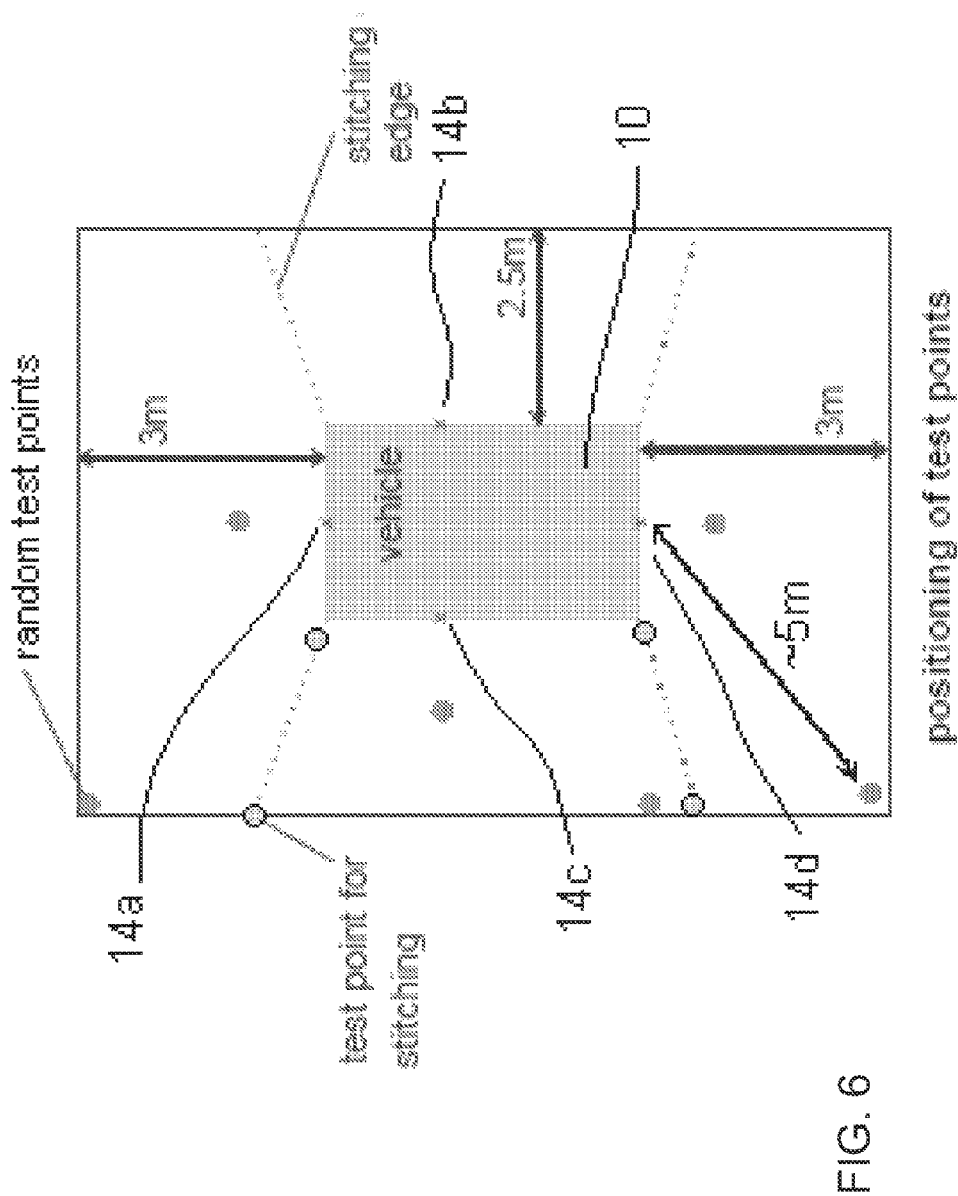
FIG. 6 is an illustration of a 360 degree top vision view as captured by the vision system and cameras of the present invention.
Figure 7:
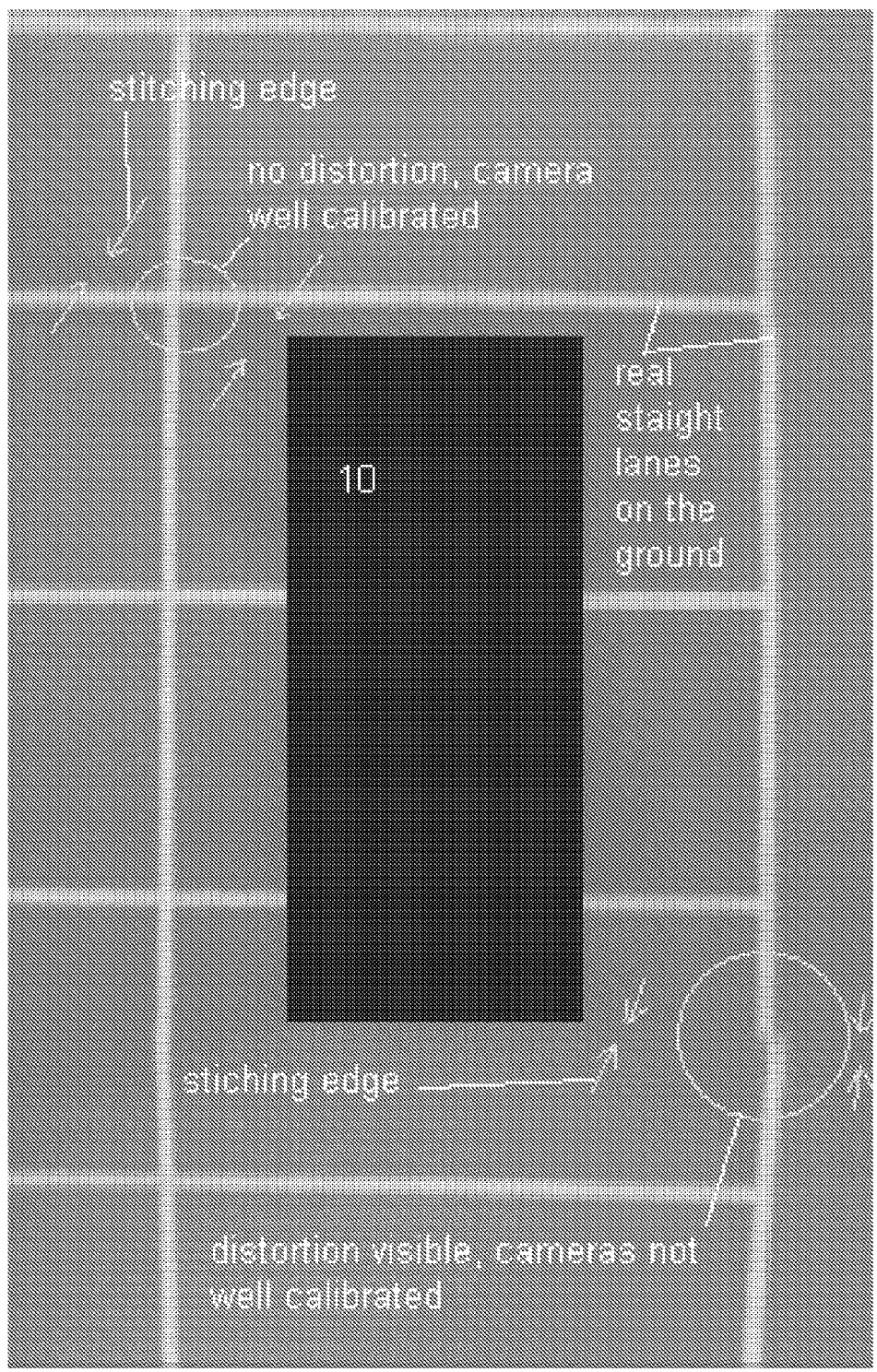
FIG. 7 is a view of captured images with two cameras well aligned and two cameras misaligned.

In virtual top view vision systems, often a radius of maximal about 5 m is visible around a vehicle. FIG. 6 shows an illustration of a 360 degrees top vision view. These top views are generated by stitching, undistorting and dewarping of transmorphed views of single cameras to one combined view. There are stitching edges between the single cameras' borderlines. In cases where the cameras are not aligned (calibrated) well, distortion between the images become visible, especially when straight lines on the ground around the vehicle are across a stitching edge. FIG. 7 shows a real scene image with two cameras that are well aligned (upper left stitching area) and two cameras that are misaligned (lower right stitching area). The left out center region of the image of FIG. 7 is where the vehicle actually is, because the ground under the vehicle is not captured by any camera of the system. When the misalignment is less than one pixel dot size, the distortion becomes substantially invisible or not discernible. In the shown example of FIG. 7, 1280×800 pixel (SVGA) cameras were in use. The resulting pixel size within a stitched top view is at about 2 cm.

Figure 8A:
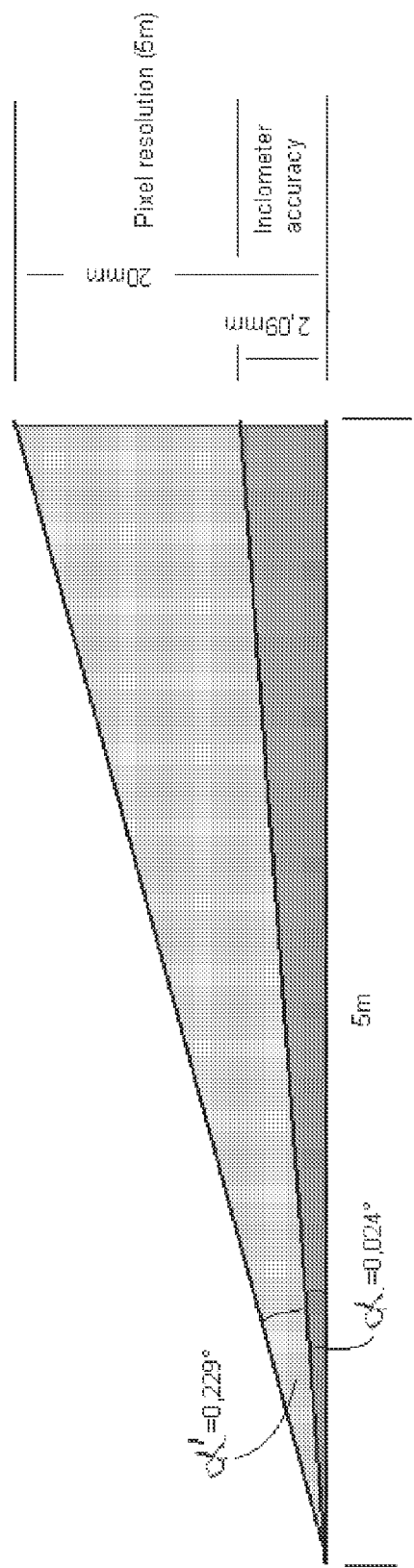
FIG. 8A is a schematic showing a comparison of pixel resolution and a typical inclination sensor accuracy.

FIG. 15B is a table that shows the relation between the misalignment angle and the resulting deviation in distance. The relation between the deviation in the given distance, the misalignment angle and the deviation is given by the geometrical mathematics: the opposing leg (deviation in the given distance) divided by the adjacent leg (distance) equates to the tangent misalignment angle. To receive the angle the arcos tangent of the division has to be used (see FIG. 15C). Since a deviation can be horizontal and vertical (two dimensional) at one time, the deviating angle adds up geometrically to a steradian angle $\theta$ (see FIG. 15D and FIGS. 8A and 8B). As shown in FIG. 8B, the steradian angle $\theta$ adds up from a horizontal component $\theta_b$ and a vertical component $\theta_c$, with (b) and (c) being the resulting opposite legs of $\theta_b$ and $\theta_c$, respectively, and (a) being the geometrical sum of (b) plus (c) and also being the resulting opposite leg of $\theta$. The angle $\theta_c$ equates to $\alpha$ in FIG. 8A (the vertical component of the angle).

The distances 5 m and 7 m are listed in FIG. 15A. It becomes clear that if the camera's alignment deviation stays under about 0.229 degrees, than no pixel distortion becomes visible within a SVGA top view having about a 2 cm pixel dot size (see, for example, FIG. 8A, where the pixel resolution at a 5 m distance of a 1280×800 pixel sensing system of 2 cm is shown as compared to a typical inclination sensor accuracy of about 0.014 degrees+0.01 degrees, with the scaling in FIG. 8A being exaggerated to improve the readability). At megapixel cameras (1920×1600 pixel) the pixel dot size is at about 1 cm within a top view image with 5 m as visible area around a vehicle. This ratio shows that the accuracy of inclination sensors (of about 0.014 degrees+/−0.01 degrees) is about five times higher in megapixel top view vision systems and about ten times higher than necessary to calibrate the visions system's cameras accurately enough to substantially prevent or limit visible distortion (less than 1 pixel).

In practice, the most economic choice would be to pick the least accurate sensor in angular accuracy which still allows the system to calibrate the vision system's cameras accurate enough so that the deviation at the furthest visible point within a top view screen is still less than one pixel. Within a top view system, the visible area around the car is limited. Typically, the visible area in front and behind the car is at about 5 meters (limited longitudinal extension) and the visible area at the side of the car is typically at about 3 meters (limited latitudinal extension), with the longitudinal extension being generally orthogonal to the longitudinal extension (the longitudinal extension typically is the longer one). Points at the far corners are the furthest. The inclination sensor angular (steradian) accuracy limit is given by the arcos tangent of the pixel size resolution at the furthest visible point at the screen divided by the distance to that point (see FIG. 15D).

Because tangent alpha is equal to the opposite leg of the triangle or distance divided by the adjacent leg of the triangle (so the deviation in the distance), the system is able to compare which deviation in the distance would become captured by one pixel. This is why the longest distance which is visible within the top view (typically the longitudinal distance, which is typically around 5 m) is preferably selected. As long the angular resolution of an inclination sensor is more accurate than the arcus tangent of the highest possible deviation in distance divided by the distance, the misalignment of a camera does not become visible. Since a deviation can occur with mixed vertical and horizontal components at the same time, the system may utilize the steradian angle θ in the tangential equation.

A single camera vision system of the present invention (such as a rear vision system having a rearward facing camera at a rear portion of the vehicle) may, for example, have an inclination sensor at the camera and a second inclination sensor at the vehicle (16*d* in FIG. 5). The second inclination sensor may be disposed within the ECU or anywhere at the vehicle (such as, for example, at the head unit of the vehicle or any other suitable location at the vehicle), as long as its initial orientation relative to the initial orientation of the camera's inclination sensor is known. During use of the vehicle and vision system, the system may compare the outputs of the two inclination sensors and may thus determine when there is a change in orientation of the camera's inclination sensor and thus a change in orientation of the camera. Responsive to such a detection or determination, the system may generate an alert (such as to indicate that a particular camera is misaligned) or may adjust the camera or image data captured by the camera (such as via a physical adjustment of the camera orientation or such as via image processing or the like) to account for or correct for the detected or determined misalignment or change in orientation of the camera.

Figure 9:
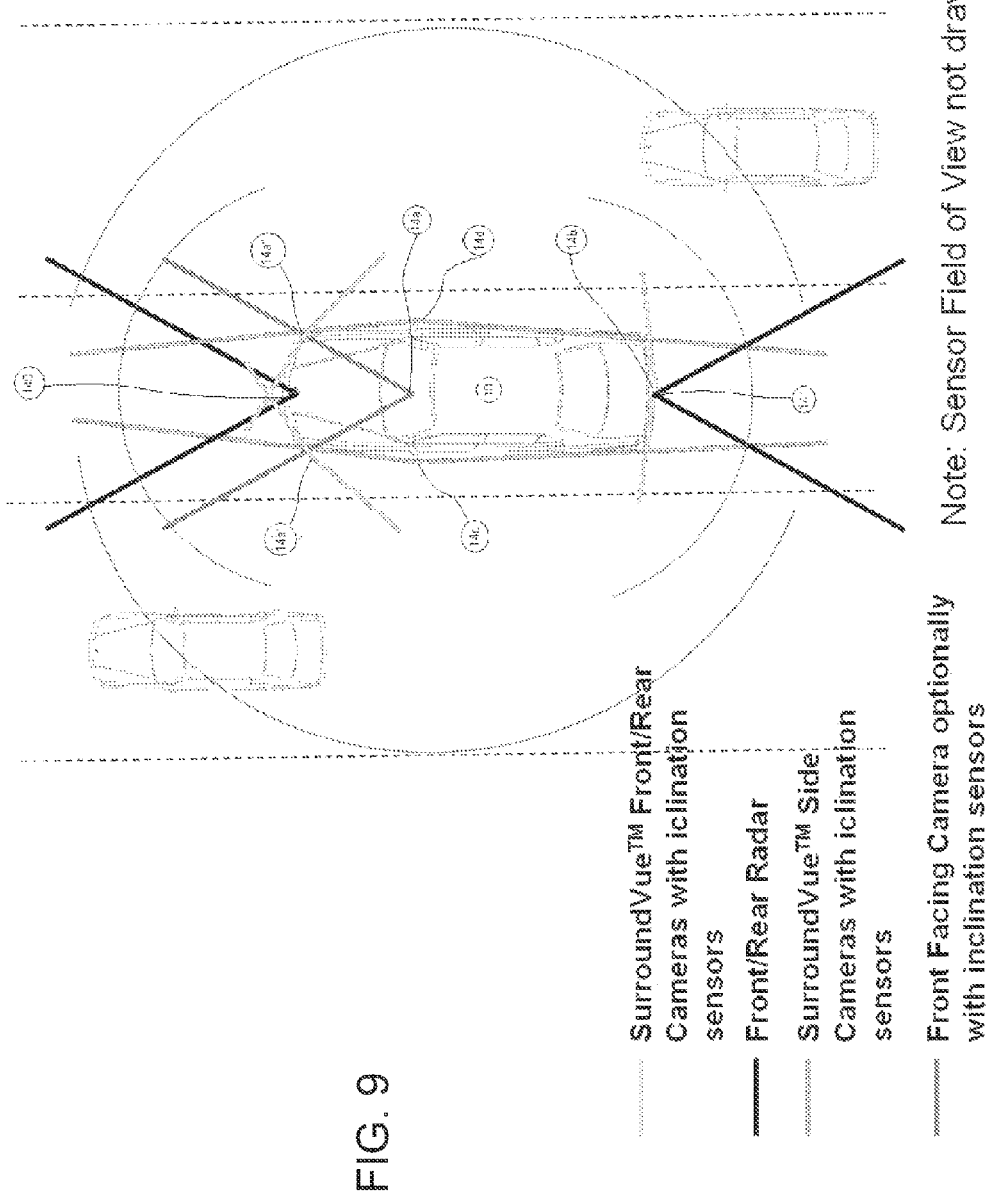
FIG. 9 is an example of a plan view of a vehicle with a combined human and machine vision system and five cameras and two radar sensors that provide exterior fields of view in accordance with the present invention.
Figure 10:
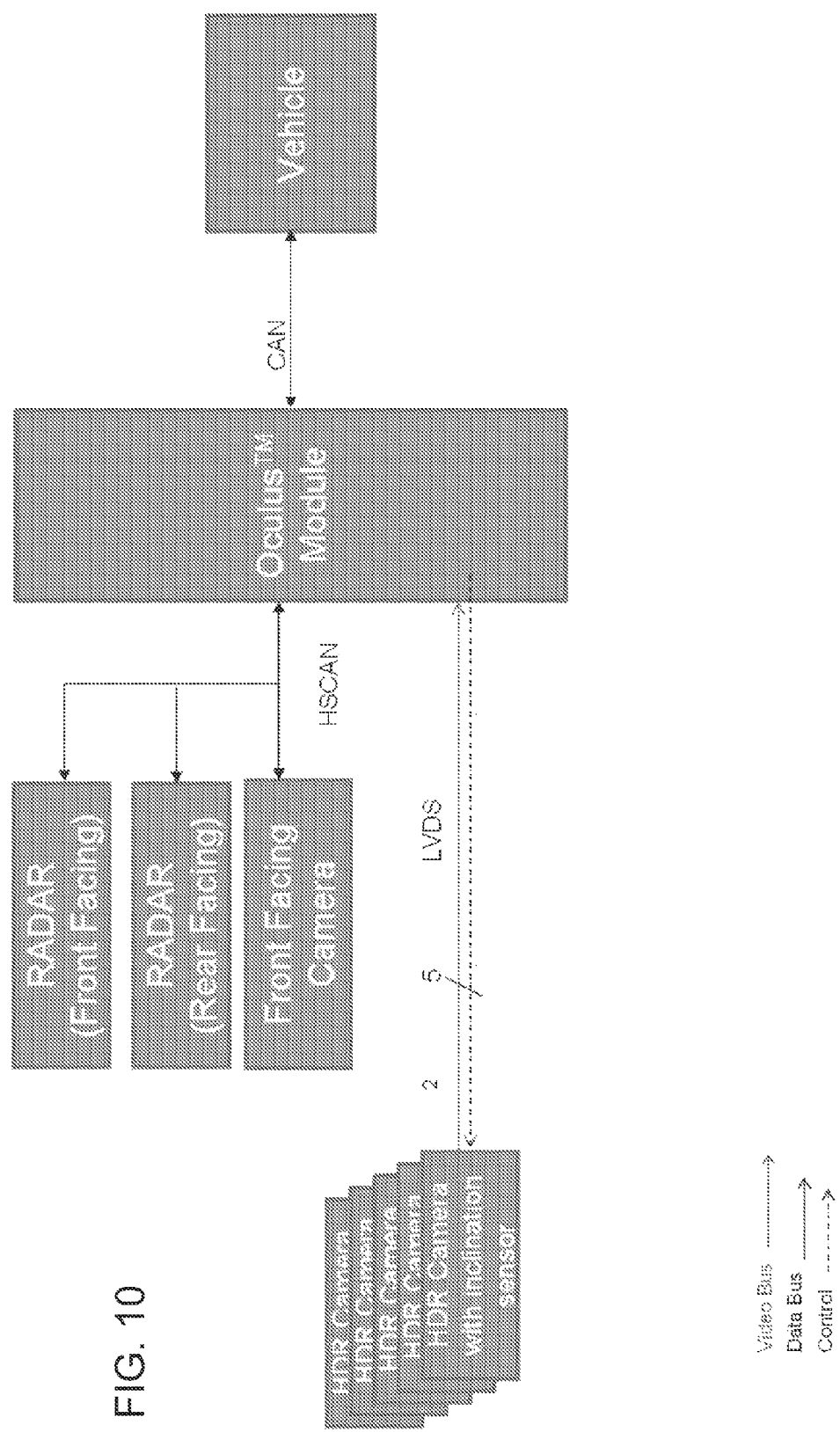
FIG. 10 is a schematic of the system of FIG. 9, showing the vision system's architecture in accordance with the present invention.

Optionally, a multi-camera vision system (such as for a surround-view system or the like) may have multiple cameras disposed at the vehicle with exterior fields of view around the vehicle (such as shown in FIGS. 1, 5, 6, 7 and 9), with most of the cameras having an inclination sensor associated therewith or attached thereto (for example, and as shown in FIGS. 9 and 10, a combined human and machine vision system may comprise or include one or more, such as two, radar sensors in addition to a four or five camera system). In such an application, an additional inclination sensor is not needed at the vehicle but such a sensor is optional as an additional reference (see reference 16*d* in FIG. 5 and see FIG. 14). The initial outputs of the cameras when properly oriented and aligned and calibrated will be received and/or input and/or known by the vision system control. Thus, the vision system control, knowing the initial outputs of the cameras' inclination sensors and thus the initial relative orientations of the cameras, can monitor the outputs of the inclination sensors and determine when one of them changes relative to the others. Responsive to such a detection or determination, the control may generate an alert (such as to indicate that a particular camera is misaligned) or may adjust the physical orientation of the misaligned camera or adjust the image processing of the image data captured by the misaligned camera or the like, in order to account for the misalignment. The multi-camera vision system thus may determine misalignment of a camera at the vehicle via the inclinometers at the cameras and an additional algorithm. The algorithm may process the sensor outputs and may determine, responsive to a relative change in the outputs of the sensors (that would be indicative of the orientation of one of the sensors changing relative to the vehicle and that would not be merely indicative of the vehicle orientation changing), which sensor or sensors is/are the reference sensor/sensors and which sensor is misaligned. The system may determine which of the sensors to use as the reference and compare the outputs of the other sensors to the reference sensor to determine the alignment or misalignment.

As shown in FIG. 9, a vehicle 10 includes or has a combined human and machine vision system, which includes five high dynamic range (HDR) cameras, such as a front right side corner camera 14*a'*, a front left side corner camera 14*a"*, a rear or rearward facing center camera 14*b* and wide angle left and right side cameras 14*c*, 14*d* that provide exterior fields of view in accordance with the present invention (optionally, the system may include a front or forward facing center camera 14*a*). The system also includes a front radar sensor 140 and a rear radar sensor 141. FIG. 10 is a schematic of the specific example of FIG. 9 showing the vision system's architecture in accordance with the present invention. The Oculus Module may comprise a system-on-chip or Electronic Control Unit (ECU). In the illustrated embodiment, the LVDS data line comprises a full duplex. The front facing camera may comprise an EPM3™ camera or the like, and may have or utilize or be associated with an image processor, such as am EyeQ™ or EyeQ2™ or EyeQ3™ processor, such as are provided by Mobileye® (where the image processor utilizes object detection software or the like in processing image data captured by the camera or cameras), or the like. The image data captured by the five cameras (such as five HDR cameras) may be communicated to the module via a video bus communication link 2, and the module may provide a control signal 5 to the cameras. A data bus (such as a CAN or LIN or Ethernet data bus or network or an HSCAN data bus or network) may be utilized to communicate signals between the module and the radar sensors (and optionally the front facing camera) and/or the vehicle. The system may generate control signals that provide braking control and/or vehicle steering control responsive to the captured image data and outputs of the radar sensors.

Figure 11:
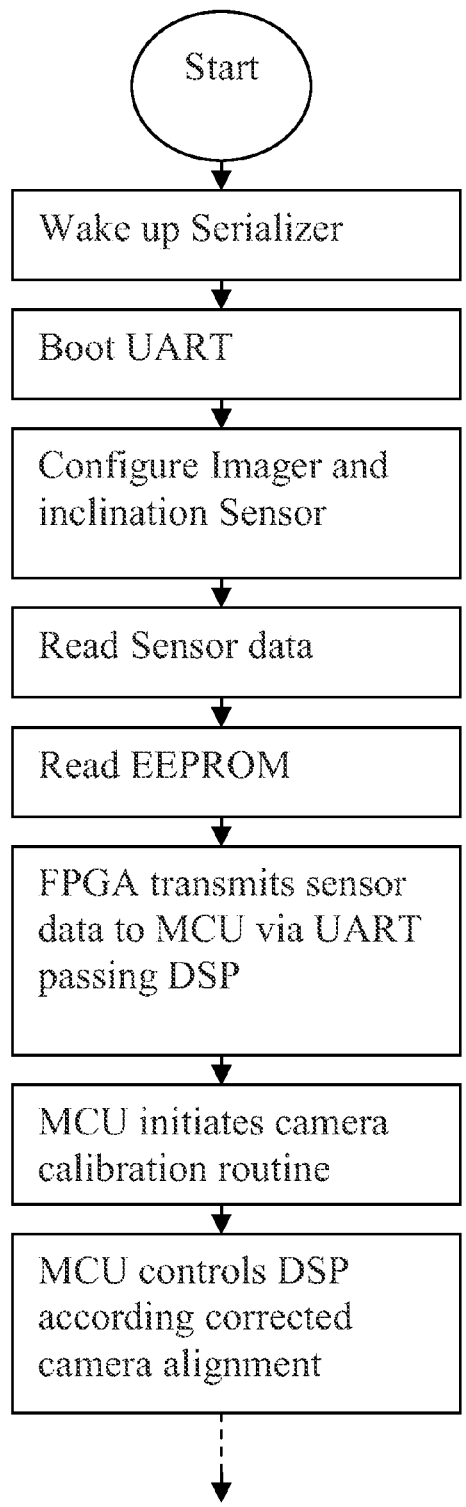
FIG. 11 is a flow chart showing an initialization and alignment correction algorithm in accordance with the present invention.
Figure 12:
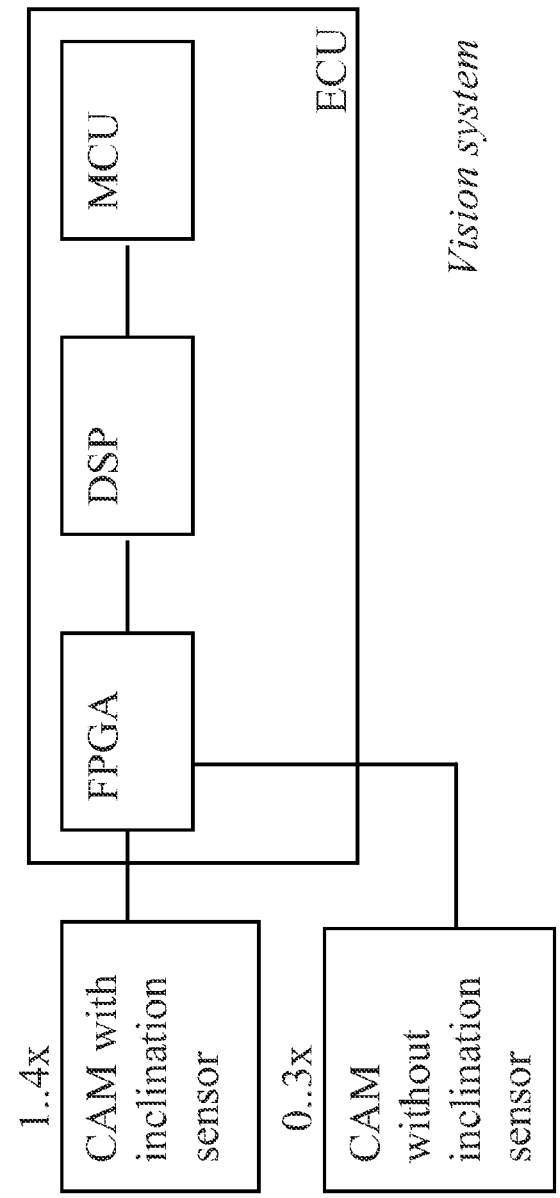
FIG. 12 is a schematic showing a surround view system architecture scheme having camera alignment sensors within some or all cameras in accordance with the present invention.
Figure 13:
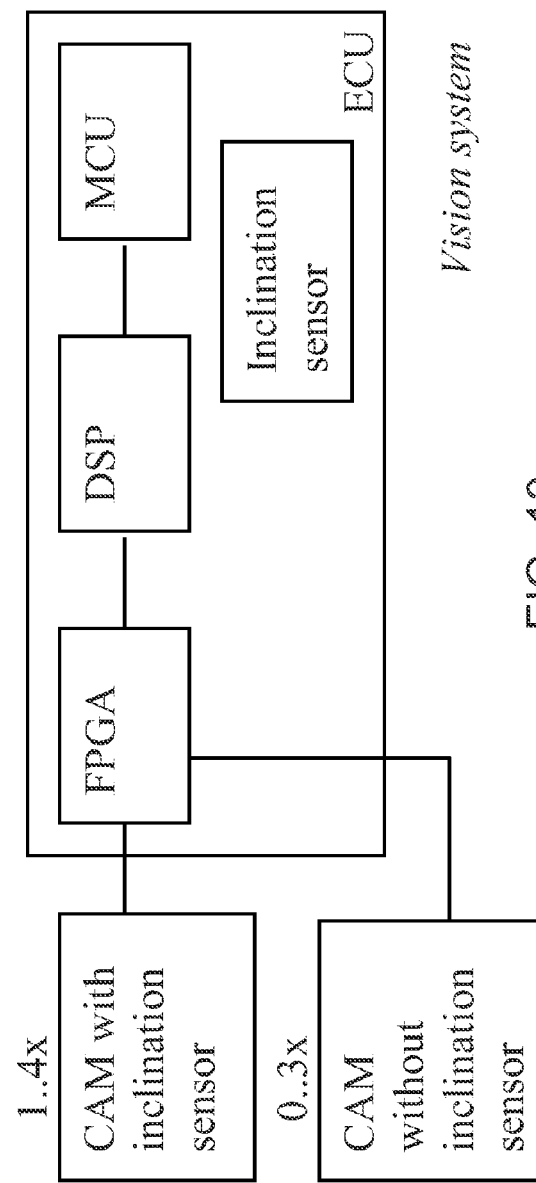
FIG. 13 is a schematic showing a surround view system architecture scheme having camera alignment sensors within some or all cameras and an additional inclination sensor within the ECU in accordance with the present invention.
Figure 14:
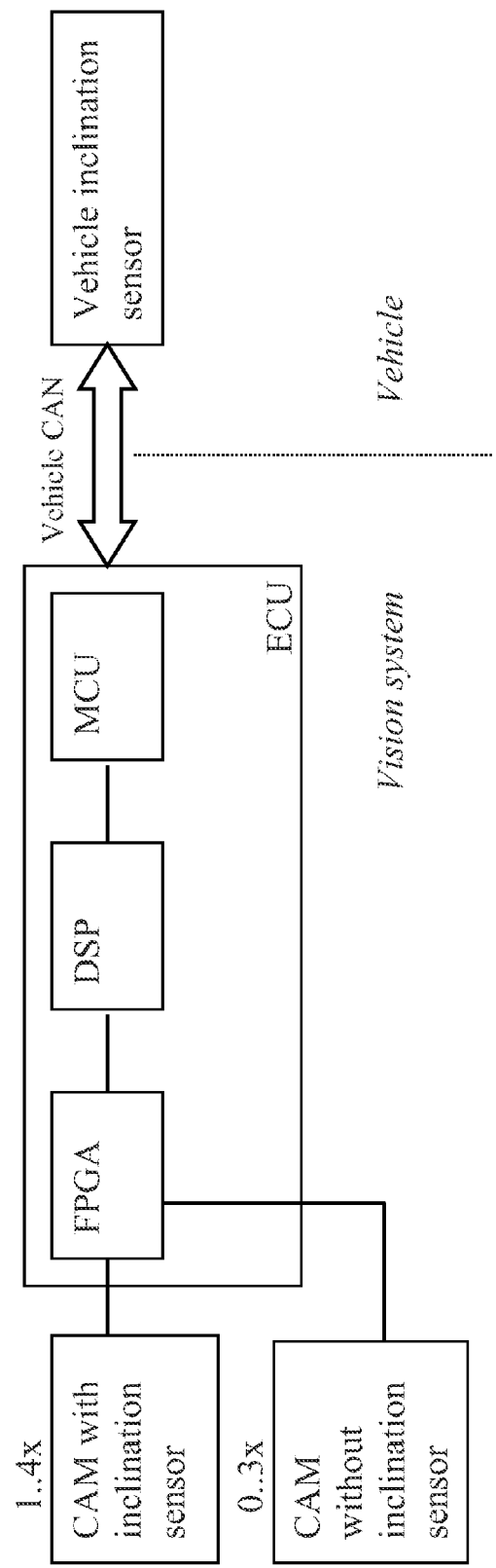
FIG. 14 is a schematic showing a surround view system architecture scheme having camera alignment sensors within some or all cameras and an additional inclination sensor attached to the vehicle in accordance with the present invention.

An exemplary initialization and alignment correction algorithm according to the present invention is shown in the chart of FIG. 11. An according surround view system architecture scheme having camera alignment sensors (inclinometers) within some or all of the cameras is shown in the chart of FIG. 12. FIG. 13 is a chart showing a preferred embodiment of the present invention's system architecture having an additional inclination sensor assembled within the ECU for providing a reference normal signal in addition to inclination sensor signals of the visions system's cameras. FIG. 14 is a chart showing an example of the architecture having the additional inclination sensor attached to the vehicle (see reference 16d in FIG. 5) providing a (vehicle's level) reference normal signal in addition to inclination sensor signals of the visions system's camera via CAN or LIN bus interfaces (or other suitable communication network or link or Ethernet communication link or the like) to the vision system control or MCU.

The camera alignment correction/calibration algorithm may not always be allowed to run due to manufacturer requirements. For example, there may be limited modes in which a calibration run is enabled. Also, there might be limitations in the minimum required start up time or shut down time or to energy consumption while idling. The transfer channels might have limited capacity as well. To cope with these matters, the transfer of the three axis (vector) of an inclinometer may be transferred within the SYNC gap between images during run time or incorporate into the image stream, such as by utilizing aspects of the systems described in U.S. provisional application Ser. No. 61/567,446, filed Dec. 6, 2011, which is hereby incorporated herein by reference in its entirety. The inclination vector data may be stored in the MCU so as to be present at times when a calibration cycle is enabled.

The vision system may include a display screen that is disposed in the vehicle (such as at an interior rearview mirror assembly or windshield electronics module or the like in the cabin of the vehicle and at or near the in-cabin surface of the vehicle windshield) and viewable by the driver of the vehicle. The vision system is operable to display images representative of captured image data on the display screen. The vision system is operable in a virtual top view vision mode and, when operating in the top view vision mode, the processing system processes image data captured by the imaging sensors to at least one of combine and manipulate the image data, and, when operating in the top view vision mode, the vision system displays an exterior scene (such as via the combination and/or manipulation or stitching or merging of the image data captured by the plurality of cameras) around the vehicle. The displayed exterior scene is around the vehicle and may have a first limited extension in one dimension (such as forwardly of the vehicle and along the field of view of the forward facing camera) and a second limited extension in a second orthogonal dimension (such as sidewardly of the vehicle), wherein the result of a tangent steradian accuracy of the at least one inclination sensor divided by a longer one of the first and second limited extensions is greater than the highest resolution of at least one of the image sensors along the longer limited extension's path.

Thus, the present invention provides a means for determining a misalignment of a camera at a vehicle. If the intrinsic parameters of a camera are measured together with the inclinometer of the camera (such as inside the camera or at the camera), the camera may be aligned to the vehicle without any target in the camera's field of view and without any image processing of images captured by the camera. The changes of the camera-to-vehicle alignment over the vehicle or camera or system life or due to temperature variations or the like can be readily corrected using relatively simple algorithms (either while the vehicle is being driven on a road or when the vehicle is parked or otherwise not in use). Also, the system of the present invention allows for replacement of a damaged camera without requiring special service calibration procedures (for example, no drives or targets are needed to calibrate/align the new camera). Also, the present invention does not require any complicated preconditions when using image processing algorithms (dependencies to other software modules such as a camera control function or the like).

The system of the present invention thus utilizes two or more inclination sensors or level sensors, and the two or more inclination sensors may be part of or associated with respective cameras, or one or more inclination sensors may be associated with a respective one or more cameras and another inclination sensor may be disposed at the vehicle separate from any camera. For example, the system may utilize an inclination sensor that is already part of or incorporated at the vehicle, such as a level sensor or the like that is used by a leveling system of the vehicle to adjust the suspension to level the vehicle. The system utilizes two inclination sensors to detect a misalignment or threshold degree of misalignment of one or more cameras (having an inclination sensor associated therewith) mounted at the vehicle, such as at an exterior rearview mirror assembly of the vehicle and/or at a rear portion of the vehicle and/or at a front portion of the vehicle and/or at an interior rearview mirror assembly and/or windshield electronics module of the vehicle. The system of the present invention may be particularly useful when the camera and inclination sensor or inclinometer are disposed or used in an exterior rearview or sideview mirror assembly, and the system of the present invention may utilize aspects of (or may operate in conjunction with or separate from) the systems described in U.S. Pat. Nos. 8,066,415; 7,991,522; and/or 7,720,580, and/or PCT Application No. PCT/CA2012/000378, filed Apr. 25, 2012, and/or U.S. patent application Ser. No. 12/508,840, filed Jul. 24, 2009 and published Jan. 28, 2010 as U.S. Publication No. US-2010-0020170, and/or U.S. provisional applications, Ser. No. 61/570,017, filed Dec. 13, 2011; Ser. No. 61/588,833, filed Jan. 20, 2012; and/or Ser. No. 61/613, 651, filed Mar. 21, 2012, which are all hereby incorporated herein by reference in their entireties.

The imaging sensor and its photosensor array may comprise any suitable camera or sensing device, such as, for example, an array of a plurality of photosensor elements arranged in 640 columns and 480 rows (a 640×480 imaging array) or more (such as discussed above), with a respective lens focusing images onto respective portions of the array. The photosensor array may comprise a plurality of photosensor elements arranged in a photosensor array having rows and columns.

The logic and control circuit of the imaging sensor may function in any known manner, such as in the manner described in U.S. Pat. Nos. 5,550,677; 5,877,897; 6,498, 620; 5,670,935; 5,796,094; 6,396,397, and/or U.S. patent application Ser. No. 13/534,657, filed Jun. 27, 2012, and/or U.S. provisional applications, Ser. No. 61/666,146, filed Jun. 29, 2012; Ser. No. 61/653,665, filed May 31, 2012; Ser. No. 61/653,664, filed May 31, 2012; Ser. No. 61/650,667, filed May 23, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2011; Ser. No. 61/570, 017, filed Dec. 13, 2011; Ser. No. 61/568,791, filed Dec. 9, 2011; Ser. No. 61/567,446, filed Dec. 6, 2011; Ser. No. 61/559,970, filed Nov. 15, 2011; Ser. No. 61/552,167, filed Oct. 27, 2011; Ser. No. 61/540,256, filed Sep. 28, 2011; and/or Ser. No. 61/511,738, filed Jul. 26, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, and/or U.S. provisional applications, Ser. No. 61/567,150, filed Dec. 6, 2011; Ser. No. 61/565,713, filed Dec. 1, 2011; and/or Ser. No. 61/537,279, filed Sep. 21, 2011, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, and/or International Publication No. WO 2010/099416, published Sep. 2, 2010, and/or PCT Application No. PCT/US10/47256, filed Aug. 31, 2010, and/or PCT Application No. PCT/US2012/048110, filed Jul. 25, 2012, and/or U.S. patent application Ser. No. 12/508, 840, filed Jul. 24, 2009, and published Jan. 28, 2010 as U.S. Pat. Publication No. US 2010-0020170, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260, 400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670, 935; 5,760,962; 5,715,093; 5,877,897; 6,922,292; 6,757, 109; 6,717,610; 6,590,719; 6,201,642; 6,498,620; 5,796, 094; 6,097,023; 6,320,176; 6,559,435; 6,831,261; 6,806, 452; 6,396,397; 6,822,563; 6,946,978; 7,339,149; 7,038, 577; 7,004,606; 7,720,580; and/or 7,965,336, and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149; and/or 7,526, 103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978; and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226, 628, filed Sep. 14, 2005 and published Mar. 23, 2006 as U.S. Publication No. US-2006-0061008, and/or Ser. No. 12/578, 732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety). The display screen or display device may be disposed at or in the interior rearview mirror assembly or may comprise a navigational display of the vehicle, such as may be disposed at the instrument panel or console of the vehicle or the like.

As discussed above, the vision system (utilizing a forward and/or rearward facing camera and other cameras disposed at the vehicle with exterior fields of view) comprises and utilizes a plurality of cameras (such as utilizing a rearward facing camera and sidewardly facing cameras and a forwardly facing camera disposed at the vehicle), and provides a display of a top-down view or birds-eye view of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US11/62834, filed Dec. 1, 2011 and published Jun. 7, 2012 as International Publication No. WO 2012-075250, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/613,651, filed Mar. 21, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display or displays may comprise a video display and may utilize aspects of the video display devices or modules described in U.S. Pat. Nos. 6,690,268; 7,184,190; 7,274,501; 7,370,983; 7,446,650; and/or 7,855,755; and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle.

Changes and modifications to the specifically described embodiments may be carried out without departing from the principles of the present invention, which is intended to be limited only by the scope of the appended claims as interpreted according to the principles of patent law.

The invention claimed is:
1. A vision system for a vehicle, said vision system comprising:
   a plurality of imaging sensors disposed at the vehicle and having respective exterior fields of view, said imaging sensors capturing respective image data, wherein each of said imaging sensors includes a respective inclination sensor;

at least one other inclination sensor disposed at the vehicle;

a processing system that is operable to process outputs of said inclination sensors to determine an alignment or misalignment of said at least one imaging sensor at the vehicle;

a display screen in the vehicle and viewable by the driver of the vehicle;

wherein said vision system is operable to display images representative of said captured image data on said display screen;

wherein said vision system is operable in a virtual top view vision mode, and wherein, when operating in said virtual top view vision mode, said processing system processes image data captured by said plurality of imaging sensors to at least one of combine and manipulate said image data, and wherein, when operating in said virtual top view vision mode, said vision system displays an exterior scene around the vehicle;

wherein the displayed exterior scene is around the vehicle and has a first limited extension in a first dimension and a second limited extension in a second dimension, and wherein said second dimension is generally orthogonal to said first dimension, and wherein the result of a tangent steradian accuracy of said at least one inclination sensor divided by a longer one of said first and second limited extensions is greater than the highest resolution of at least one of said imaging sensors having its field of view along said longer limited extension's path.

2. The vision system of claim 1, wherein said processing system processes outputs of said inclination sensors of said plurality of imaging sensors to determine a misalignment of one of said plurality of imaging sensors relative to the vehicle.

3. The vision system of claim 1, wherein said at least one other inclination sensor comprises an inclination sensor of one of said plurality of imaging sensors.

4. The vision system of claim 1, wherein said at least one other inclination sensor comprises a plurality of inclination sensors.

5. The vision system of claim 1, wherein said at least one other inclination sensor comprises an inclination sensor of the vehicle.

6. A vision system for a vehicle, said vision system comprising:

a plurality of cameras disposed at the vehicle and having respective exterior fields of view, said cameras capturing image data;

wherein each of said cameras includes a camera inclination sensor;

at least one vehicle inclination sensor disposed at the vehicle;

a processing system that is operable to process outputs of said camera inclination sensors and said vehicle inclination sensor to determine an alignment or misalignment of said cameras at the vehicle;

a display screen in the vehicle and viewable by the driver of the vehicle, wherein said vision system is operable to display images representative of captured image data on said display screen;

wherein said vision system is operable in a virtual top view vision mode, and wherein, when operating in said virtual top view vision mode, said processing system processes captured image data to at least one of combine captured image data and manipulate captured image data, and wherein, when operating in said virtual top view vision mode, said vision system displays an exterior scene around the vehicle on said display screen; and wherein the displayed exterior scene is around the vehicle and has a first limited extension in a first dimension and a second limited extension in a second dimension, and wherein said second dimension is generally orthogonal to said first dimension, and wherein the result of a tangent steradian accuracy of said camera inclination sensor divided by a longer one of said first and second limited extensions is greater than the highest resolution of said camera having its field of view along said longer limited extension's path.

7. The vision system of claim 6, wherein said processing system is operable to compare an output of each of said camera inclination sensors with an output of said vehicle inclination sensor to determine a degree of misalignment of each of said cameras at the vehicle.

8. The vision system of claim 7, wherein, responsive to said comparison of outputs resulting in a determination of a misalignment of at least one of said cameras, said vision system is operable to adjust one of (i) said at least one of said cameras and (ii) processing of image data captured by said at least one of said cameras.

9. The vision system of claim 6, wherein said camera inclination sensors and said vehicle inclination sensor each comprise a multi axis inclination sensor, and wherein said processing system can determine at least two of (i) a roll of the sensor, (ii) a pitch of the sensor and (iii) a yaw of the sensor.

10. A vision system for a vehicle, said vision system comprising:

a plurality of cameras disposed at the vehicle and having respective exterior fields of view, said cameras capturing image data;

a camera inclination sensor at each of said plurality of cameras and used to determine an orientation of the respective cameras relative to the earth, wherein said camera inclination sensors are fixedly disposed relative to the respective cameras;

at least one vehicle inclination sensor fixedly disposed at the vehicle and used to determine an orientation of the vehicle relative to the earth;

wherein said camera inclination sensors and said vehicle inclination sensor comprise multi axis inclination sensors;

wherein said processing system is operable to process outputs of said camera inclination sensors and said vehicle inclination sensor;

wherein said processing system is operable to determine at least two of (i) a roll of each of said inclination sensors, (ii) a pitch of each of said inclination sensors and (iii) a yaw of each of said inclination sensors;

wherein said processing system compares an output of each of said camera inclination sensors with an output of said vehicle inclination sensor to determine a degree of misalignment of each of said cameras relative to the vehicle;

a display screen in the vehicle and viewable by the driver of the vehicle, wherein said vision system is operable to display images representative of captured image data on said display screen;

wherein said vision system is operable in a virtual top view vision mode, and wherein, when operating in said virtual top view vision mode, said processing system processes captured image data to at least one of combine captured image data and manipulate captured image data, and wherein, when operating in said virtual top view vision mode, said vision system displays an exterior scene around the vehicle on said display screen; and wherein the displayed exterior scene is around the vehicle and has a first limited extension in a first dimension and a second limited extension in a second dimension, and wherein said second dimension is generally orthogonal to said first dimension, and wherein the result of a tangent steradian accuracy of said camera inclination sensor divided by a longer one of said first and second limited extensions is greater than the highest resolution of said camera having its field of view along said longer limited extension's path.

11. The vision system of claim 10, wherein, responsive to said comparison of outputs resulting in a determination of a misalignment of at least one of said cameras, said vision system is operable to adjust one of (i) said at least one of said cameras and (ii) processing of image data captured by said at least one of said cameras.

12. The vision system of claim 10, wherein said processing system is operable to determine (i) a roll of each of said inclination sensors, (ii) a pitch of each of said inclination sensors and (iii) a yaw of each of said inclination sensors.

* * * * *